United States Patent
Park et al.

(10) Patent No.: US 9,235,983 B2
(45) Date of Patent: Jan. 12, 2016

(54) APPARATUS AND METHODS FOR GROUP-BASED REACTIVE SERVICE DISCOVERY

(71) Applicant: Intel Corporation, Santa Clara, CA (US)

(72) Inventors: Minyoung Park, Portland, OR (US); Sanghoon Kim, Ann Arbor, MI (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 13/713,953

(22) Filed: Dec. 13, 2012

(65) Prior Publication Data

US 2014/0112222 A1    Apr. 24, 2014

Related U.S. Application Data

(60) Provisional application No. 61/715,916, filed on Oct. 19, 2012.

(51) Int. Cl.
| | |
|---|---|
| *H04W 84/12* | (2009.01) |
| *G08C 17/02* | (2006.01) |
| *H04W 4/08* | (2009.01) |
| *H04W 52/02* | (2009.01) |
| *H04L 29/08* | (2006.01) |

(52) U.S. Cl.
CPC .............. *G08C 17/02* (2013.01); *H04L 67/16* (2013.01); *H04W 4/08* (2013.01); *H04W 52/0235* (2013.01)

(58) Field of Classification Search
USPC .................. 370/260, 261, 338, 329
See application file for complete search history.

(56) References Cited

U.S. PATENT DOCUMENTS

| | | | |
|---|---|---|---|
| 2004/0103278 A1 | 5/2004 | Abhishek et al. | |
| 2005/0058151 A1* | 3/2005 | Yeh ............................... | 370/445 |
| 2005/0143145 A1* | 6/2005 | Maekawa ...................... | 455/574 |
| 2005/0254472 A1 | 11/2005 | Roh et al. | |
| 2008/0137682 A1 | 6/2008 | Kish et al. | |
| 2009/0103501 A1* | 4/2009 | Farrag et al. ................... | 370/337 |

(Continued)

FOREIGN PATENT DOCUMENTS

| | | |
|---|---|---|
| WO | WO-2011081705 A2 | 7/2011 |
| WO | WO 2014/062250 | 4/2014 |
| WO | WO-2014062251 A1 | 4/2014 |

OTHER PUBLICATIONS

"International Application Serial No. PCT/US2013/048701, International Search Report mailed Oct. 22, 2013", 5 pgs.

(Continued)

*Primary Examiner* — Andrew Lee
(74) *Attorney, Agent, or Firm* — Schwegman Lundberg & Woessner, P.A.

(57) ABSTRACT

Apparatus and methods for, among other things, a group-based reactive service discovery protocol are discussed. In an example, a method can include broadcasting a first group beacon at a group interval using a first station belonging to a first group of stations and broadcasting a service request to the second group during a query interval of the second group. In an example, the first group beacon can include a service update alert configured to alert other members of the first group of an anticipated service request and response event to learn services available from a second group. In an example, the service update alert can include a beginning time for the anticipated service request and response event.

19 Claims, 6 Drawing Sheets

(56) References Cited

U.S. PATENT DOCUMENTS

| | | |
|---|---|---|
| 2009/0215482 A1 | 8/2009 | Blange et al. |
| 2011/0075599 A1 | 3/2011 | Liao et al. |
| 2011/0310770 A1 | 12/2011 | Liang et al. |
| 2013/0094536 A1 | 4/2013 | Hui et al. |
| 2013/0155925 A1 | 6/2013 | Priyantha et al. |
| 2013/0163425 A1 | 6/2013 | Hughes et al. |
| 2013/0172036 A1 | 7/2013 | Miklos et al. |
| 2013/0235773 A1* | 9/2013 | Wang et al. ............ 370/311 |
| 2013/0259018 A1* | 10/2013 | Ji et al. ............ 370/338 |
| 2013/0265906 A1* | 10/2013 | Abraham et al. ............ 370/254 |
| 2013/0268654 A1* | 10/2013 | Abraham et al. ............ 709/224 |
| 2013/0279381 A1* | 10/2013 | Sampath et al. ............ 370/311 |
| 2014/0115149 A1 | 4/2014 | Kim et al. |

OTHER PUBLICATIONS

"International Application Serial No. PCT/US2013/048701, Written Opinion mailed Oct. 22, 2013", 6 pgs.

"International Application Serial No. PCT/US2013/048706, International Search Report mailed Sep. 27, 2013", 5 pgs.

"International Application Serial No. PCT/US2013/048706, Written Opinion mailed Sep. 27, 2013", 5 pgs.

Hong, Se Gi, et al., "Measurements of Multicast Service Discovery in a Campus Wireless Network", IEEE Global Telecommunications Conference, 2009. GLOBECOM 2009., (2009), 1-6.

Xu, Ziqiang, et al., "Reputation-Enhanced QoS-based Web Services Discovery", IEEE International Conference on Web Services, 2007. ICWS 2007., 249-256.

"U.S. Appl. No. 13/713,993, Non Final Office Action mailed Jan. 5, 2015", 14 pgs.

"U.S. Appl. No. 13/713,993, Response filed Sep. 17, 2014 to Restriction Requirement Jul. 17, 2014", 6 pgs.

"U.S. Appl. No. 13/713,993, Restriction Requirement mailed Jul. 17, 2014", 6 pgs.

\* cited by examiner

APPARATUS AND METHODS FOR GROUP-BASED REACTIVE SERVICE DISCOVERY

CLAIM OF PRIORITY AND RELATED APPLICATIONS

This application claims the benefit of priority under 35 U.S.C. 119(e) to Kim et al., U.S. Provisional Patent Application Ser. No. 61/715,916, entitled, "METHOD OF COORDINATED QUERY AND RESPONSE FOR SERVICE DISCOVERY", filed Oct. 19, 2012, hereby incorporated by reference herein in its entirety.

TECHNICAL FIELD

Examples pertain service discovery protocols and, more particularly, to coordinated service discovery communications for individual stations and groups of wireless devices.

BACKGROUND

Service discovery protocols can allow devices to find available services with or without intervention of a device user. When service discovery is combined with wireless devices, such as personal digital assistants, personal media players, cell phones, smart phones and tablets, it can provide many interesting possibilities. In some cases, wireless devices can find available services in the near area automatically. Friends in the same area can play games together with smart phones. One characteristic of this proximity based service discovery is that each device can be a service provider as well as a user. As such, it can be beneficial for a first device to inform other devices about available services on the first device at the same relative time the first device discovers service from other devices. There are some existing service discovery protocols such as Wi-Fi Direct, Universal Plug and Play (Upnp) and Bonjour. However, existing protocols use individual service advertisement or individual service request and response and, as such, when the number of devices in an area increases, existing service discovery protocols can create high communication traffic volumes and can cause each station to consume a lot of energy monitoring and responding to service discovery requests.

DESCRIPTION

The inventors have recognized a more efficient group-based reactive service discovery protocol that can assist in service and social information awareness and can advertise general social information and services of a station on a regular basis while at the same time reducing overhead and energy consumption associated with acquiring service information of other groups and stations in comparison to proactive service discovery protocols. Although not limited to all-connected groups, in certain examples, a group-based reactive service discovery protocol can achieve significant reductions in overhead and energy consumption when used with all-connected groups of stations, such as wireless devices.

Figure 1A:
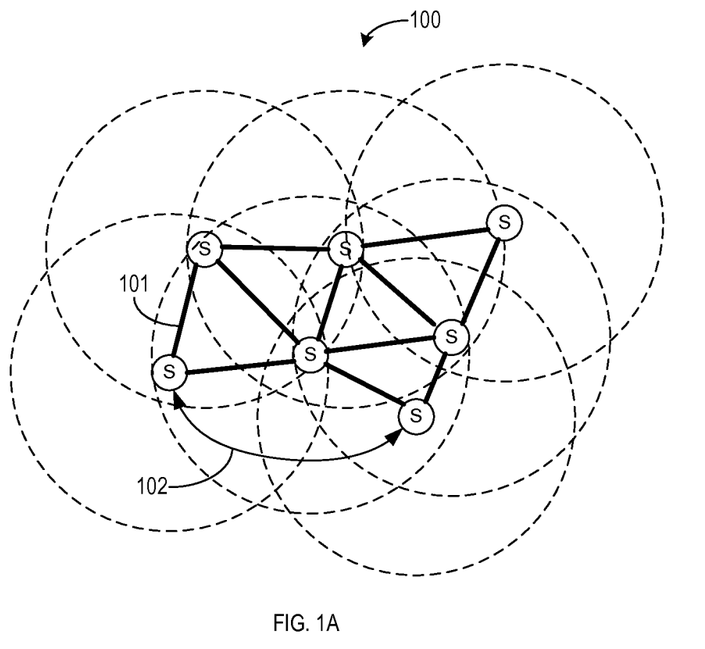
FIG. 1A illustrates generally a group of stations that allow multi-hop communications between member stations.

FIG. 1A illustrates generally number of stations (S), such as wireless devices, configured in a group 100 that allows single-hop communications 101 as well as multi-hop communications 102 between member stations (S) of the group 100. A multi-hop connection, as an example can exist when a first member station uses one or more other member stations to communicate to a second member station. In some examples, a multi-hop connection can be used when the first member station and the second member station are not within a wireless communication range of each other.

Figure 1B:
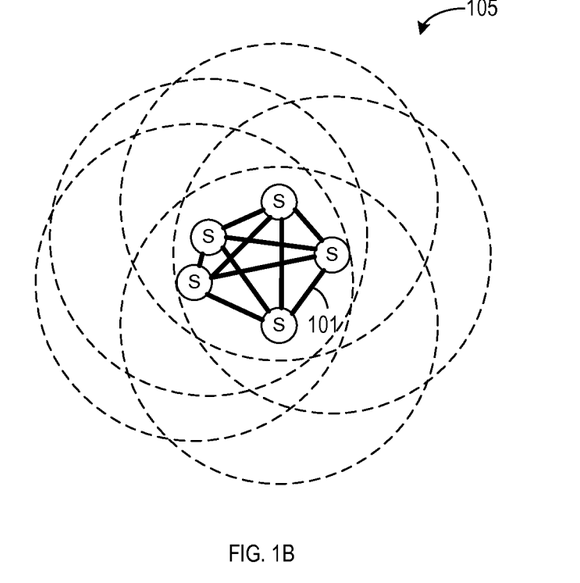
FIG. 1B illustrates generally an example all-connected group that expects each group member to be in single-hop communication with each other member of the all-connected group.

FIG. 1B illustrates generally an example all-connected group 105 that expects each group member (S) to be in single-hop communication 101 with each other member of the all-connected group 105. In such an example, the all-connected group 105 can include stations (S) where each station is within a communication range of each of the other stations belonging to the all-connected group 105.

In certain examples, each station can be a wireless station. In some examples, each station can include a transmitter, a receiver, or a transceiver capable of communication over a Institute of Electrical and Electronic Engineers (IEEE) 802.11 compatible wireless network. In certain examples, a wireless communication module can include a transmitter, a receiver, or a transceiver capable of communication over a IEEE 802.11 compatible wireless network. IN some examples, the wireless communication module can include a processor, memory and an antenna operable with a IEEE 802.11 compatible transmitter, receiver, or transceiver. In certain examples, the wireless communication module can wirelessly communicate information be stored in, or retrieved from the memory. In some examples, the transceiver, transmitter, or receiver can exchange control commands with the processor to control a mode of the wireless communication device such as switching the wireless communication device or a portion thereof into and out of a sleep mode, for example.

Figure 2A:
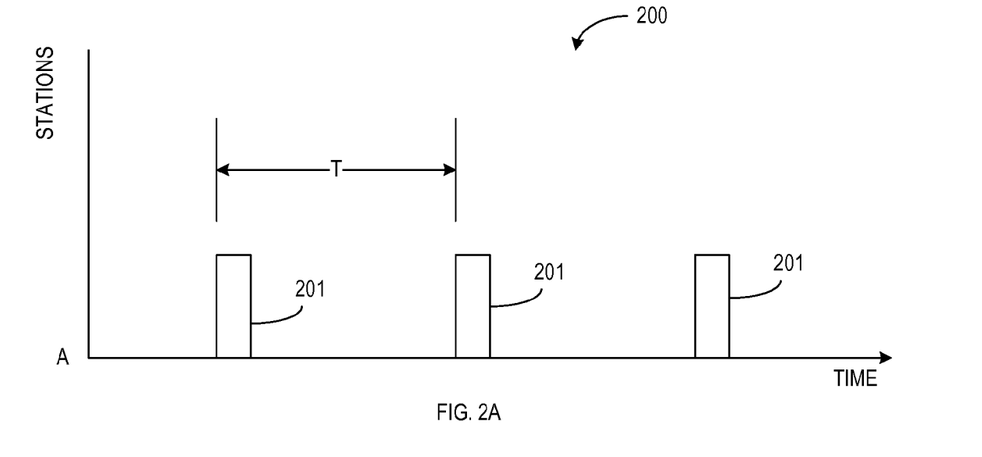
FIG. 2A illustrates generally an example of a proactive service discovery protocol.
Figure 2B:
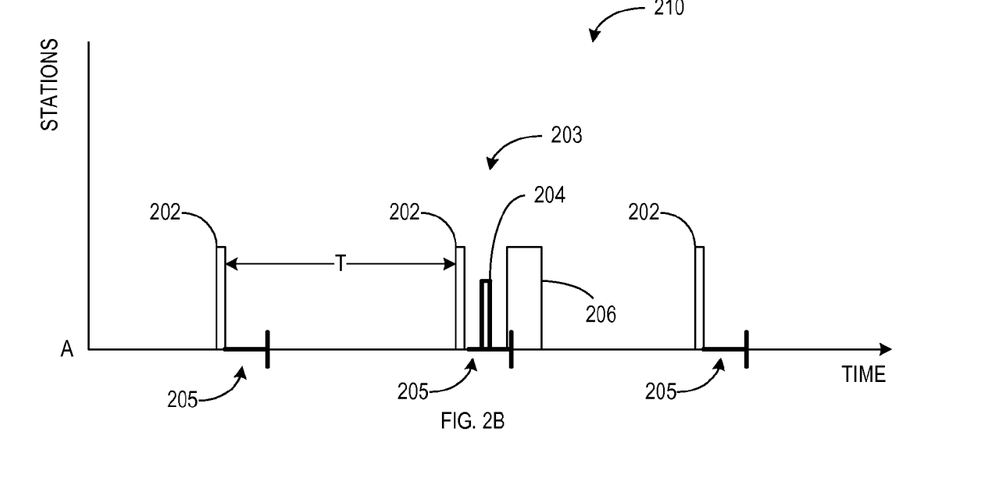
FIG. 2B illustrates generally an example of a reactive service discovery protocol.

FIG. 2A illustrates generally an example of a proactive service discovery protocol 200. The illustrated example shows communication transmissions from a first station (A). The first station (A) may or may not belong to a group of stations. In certain examples, the proactive service discovery protocol 200 expects each station or group of stations to provide a publishing beacon 201 including service information about the group. In certain examples, the proactive service discovery protocol 200 can expect a publishing beacon 201 to be broadcast, or transmitted, at a group publishing beacon interval (T). FIG. 2B illustrates generally an example of a reactive service discovery protocol 210. The illustrated example shows communication transmissions and listening, or wake-up times, of a first station (A). The first station (A) may or may not belong to a group of stations. In certain examples, each station or group of stations is expected to provide, or broadcast, a short, or energy-saving, publishing beacon 202 including service information about the group. In contrast to the proactive service discovery protocol 200, in which the publishing beacon 201 can include detailed service information, the reactive service discovery protocol 210 can include a short, or energy-saving, publishing beacon 202 that can include minimal, high-level service information. The minimalistic approach of the reactive service discovery protocol 210 can save battery capacity of the stations while still providing service information at a regular interval (T). For short publishing beacons 202 that are not received by an interested station, the loss of broadcast energy is much lower with the reactive service discovery protocol 210 than a proactive service discovery protocol 200. In addition, where there are many stations within a communication area, the short publishing beacons 202 of a reactive service discovery protocol can reduce service discovery communication traffic over a proactive service discovery protocol 200.

In certain examples, the short publishing beacon 202 of a reactive service discovery protocol 210 does not provide detailed service information of the group. However, a station interested in receiving more detailed service information from a group can initiate a service request/response event 203 of the reactive service discovery protocol 210 to receive more detailed service information of a target group. In certain applications, a station can receive a service discovery request 204 during a query window 205. In response to the service discovery request 203, the station (A) can provide a service response 206 including detailed service information about the station's (A's) group.

Figure 3:
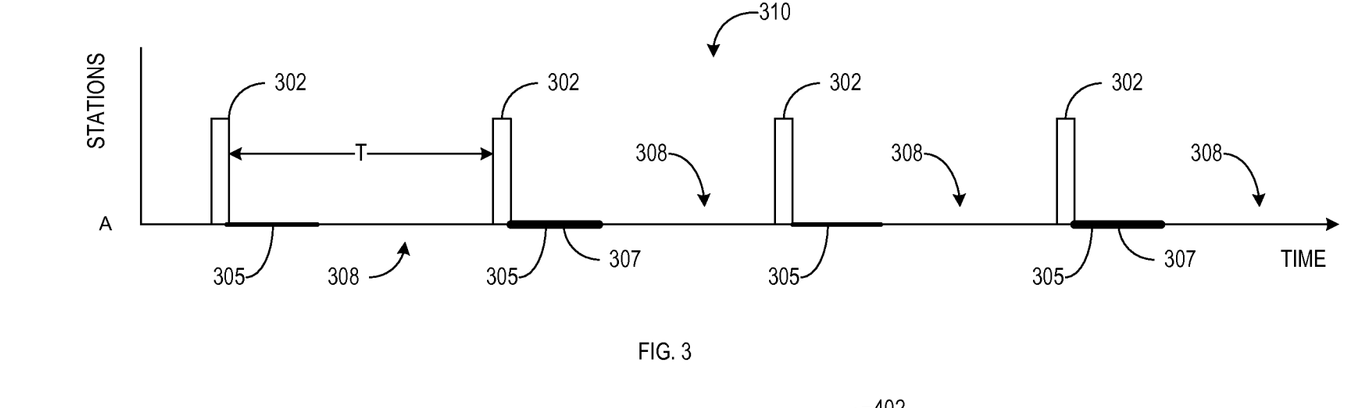
FIG. 3 illustrates generally a station beginning a new group using an example reactive service discovery protocol.

FIG. 3 illustrates generally broadcast and listen/receive intervals associated with a station (A) beginning a new group using an example reactive service discovery protocol 310. To start a group, such as when a station does not belong to a group, does not receive any publishing beacons from a nearby group, or when a station wants to initiate a group around a new element such as a new service or social aspect, the station (A) can begin to send (e.g., transmit, broadcast) a short publishing beacon 302. In certain examples, the short publishing beacon 302 can also be referred to as a publishing beacon frame. In certain examples, the station (A) can broadcast the short publishing beacon 302 at a frequency having a beacon interval (T). The short publishing beacon 302 can advertise the new group and can include general information about the group and how other stations can join the group.

In certain examples, the short publishing beacon 302 can include time synchronization information, minimal high-level service information about the group, and group maintenance information. In an example, the time synchronization information can include a publishing beacon interval (T) to inform other stations when future publishing beacons can be received as well as other activity periods that can be based on the timing of the short publishing beacon 302.

In an example, the time synchronization information can include query window information. A query window 305 can be an interval of time when a member station of a group can receive and respond to a service discovery requests from other stations such as, but not limited to, non-member stations. The query window information can indicate to other stations when a future query window can occur. In certain examples, a query window 305 can follow the broadcast of a short publishing beacon 302. In some examples, a query window 305 can follow each broadcast of a short publishing beacon 302 of a group. In some examples, a query window 305 can follow after each $N^{th}$ publishing beacon, where N is an integer number equal to or greater than 1.

In an example, the time synchronization information can include join window information. A join window 307 is an interval of time when a member station of a group can receive and respond to a join request from a non-member station. The join window information can indicate to other stations when a future join window 307 can occur. In certain examples, a join window 307 can follow the broadcast of a short publishing beacon 302. In some examples, a join window 307 can follow each broadcast of a short publishing beacon 302 of a group. In some examples, a join window 307 can follow after each $N^{th}$ publishing beacon, where N is an integer number equal to or greater than 1. In certain examples, a join window 307 and a query window 305 can overlap each other in time. In some examples, the station (A) can switch from a wake-up mode to a sleep mode 308 when the station is not scheduled to broadcast a short publishing beacon 302 or listen during a join window 307 or a query window 305.

Figure 4:
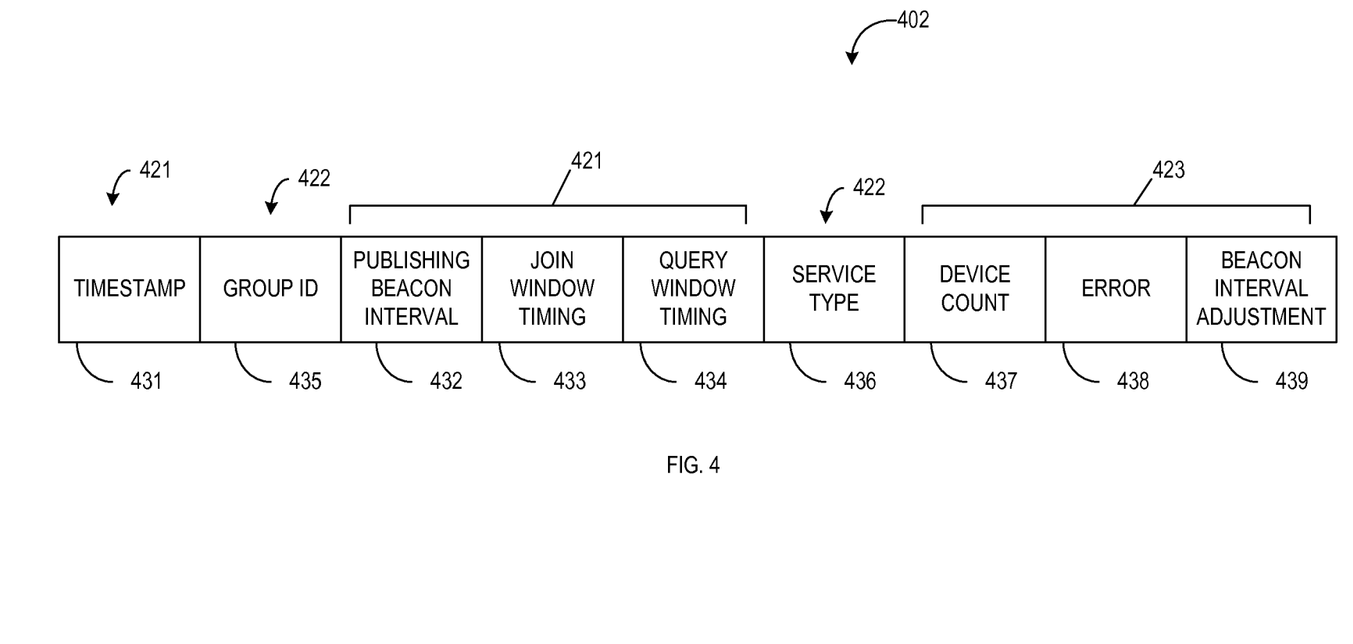
FIG. 4 illustrates generally an example publishing beacon for an example reactive service discovery protocol.

FIG. 4 illustrates generally an example short publishing beacon 402 for an example reactive service discovery protocol. In certain examples, and as discussed above, a short publishing beacon 402 can include time synchronization information 421, minimal high-level service information 422 about a group, and group maintenance information 423. In some examples, the short publishing beacon can include, but is not limited to, about 18-20 octets.

The time synchronization information 421 can include timestamp information 431, publishing beacon interval 432, join window timing information 433, and query window timing information 434. In certain examples, the timestamp information 431 can be used to assist synchronization among the stations of the group. In some examples, the timestamp information 431 can be used for synchronization of interactions of non-member stations with one or more stations of a group. In certain examples, the publishing beacon interval information 432 can inform member stations and non-member stations of the timing of a group's short publishing beacon 402.

In certain examples, the join window timing information 433 can be used to notify stations, both member and non-member stations, of timing information related to future join windows. In certain examples, all member stations of a group can be expected to wake up for a join window and the join window timing information 433 can provide each station of a group with information to accurately produce an wake-up alert for a future join window. In some examples, a join window can follow each broadcast of a short publishing beacon 402 of a group. In some examples, a join window can follow after each $N^{th}$ short publishing beacon 402, where N is an integer number equal to or greater than 1. In certain examples, the join window timing information 433 can provide notification of which short future publishing beacons 402 can be associated with a join window.

In certain examples, the query window timing information 434 can be used to notify stations, both member and non-member stations, of timing information related to future query windows. In some examples, a query window can follow each broadcast of a short publishing beacon 402 of a group. In some examples, a query window can follow after each $N^{th}$ short publishing beacon 402, where N is an integer number equal to or greater than 1. In certain examples, the query window timing information 434 can provide notification of which future short publishing beacons 402 can be associated with a query window.

In certain examples, the minimal high-level service information 422 about a group can include one or more of group identification (ID) information 435, and service type information 436. In certain examples, the group ID information 435 includes information identifying the group associated with the broadcast of the short publishing beacon 402. In certain examples, the service type information 436 can include information about the services available from the group associated with the broadcast of the short publishing beacon 402. In certain examples, the service type information 436 can include general high-level information about the available services of the group. In some examples, the service type information 436 can include a bitmap to provide an indication of the available services of the group associated with the short publishing beacon 402.

In certain examples, the group maintenance information 423 can include device count information 437, error information 438 and beacon interval adjustment information 439. In certain examples, the device count information 437 can include the number, or quantity, of stations in the group associated with the broadcast of the short publishing beacon 402. In some examples, the device count information 437 can include information related to the maximum number of stations that can be accommodated by the group associated with the broadcast of the short publishing beacon 402.

In certain examples, the error information 438 can include and be used to record pending or historical error information of the group associated with the broadcast of the short publishing beacon 402. In certain examples, the error information 438 can include an error bit map. In some examples, each bit of the error bitmap can be associated with a station of the group. In some examples, the error information 438 can be used to propagate information associated with missing stations among the member stations of the group.

In certain examples, the beacon interval adjustment information 439 can provide a station with adjustment information associated with the timing of the station's broadcast of the short publishing beacon 402. In some examples, the publishing beacon transmission interval of a station can be dynamically adjusted using the beacon interval adjustment information 439. In certain examples, when a new station is added to a group, the beacon adjustment information 439 can indicate that the interval between a station's broadcast of publishing beacons can increase by one publishing beacon interval (T). In some examples, when a member station is missing or has left the group, the beacon adjustment information 439 can indicate that the interval between a station's broadcast of publishing beacons can decrease by one publishing beacon interval (T). In certain examples, when a member station receives a publishing beacon with a non-zero value in the beacon adjustment information 439, the publishing beacon interval can be multiplied by the publishing beacon adjustment information 439 to provide the stations publishing beacon transmission interval.

Figure 5:
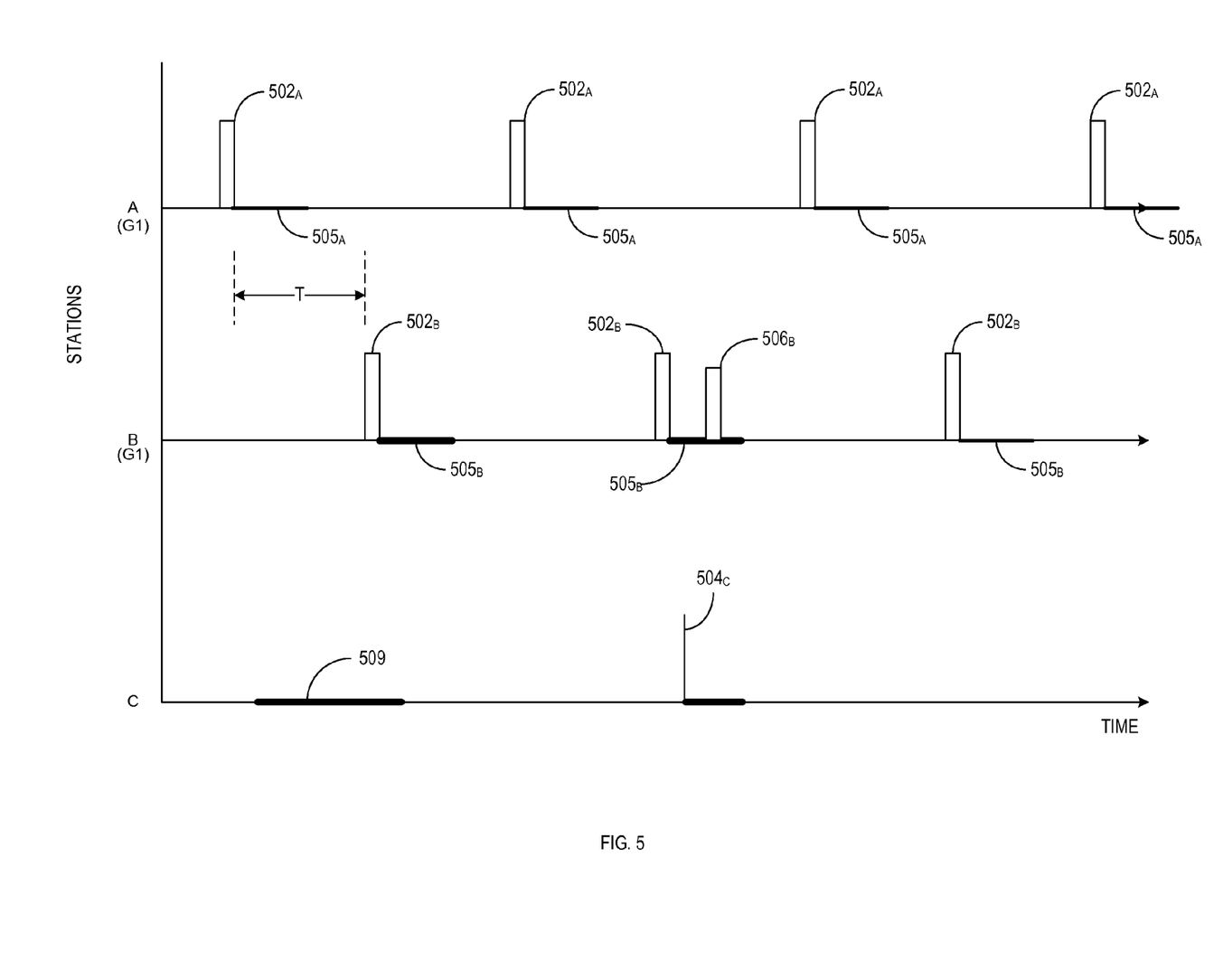
FIG. 5 illustrates generally an example service request and response event of an example reactive service discovery protocol.

FIG. 5 illustrates generally an example service request and response event 503 of an example reactive service discovery protocol. The illustrated example, includes transmission events and reception times, or awake times, for a group (G1) of stations and a third station (C). In the example, the group of stations includes a first member station (A) and a second member station (B). In certain examples, the first and second stations (A, B) of the group (G1) can alternately broadcast a short publishing beacon $502_A$, $502_B$ to advertise the group (G1). As discussed above, the short publishing beacons $502_A$, $502_B$ can be energy saving publishing beacons providing minimal high-level service information of the group (G1).

In an example, when a station (C) arrives in an area in which available services are not known, the station (C) can discover available services using a service request and response event 503 provided by a reactive service discovery protocol. Discovery of available services can begin by, for example, the third station (C) listening 509 to a channel for publishing beacons broadcast by groups in the area of the third station (C). Upon reception of a publishing beacon, such as a short publishing beacon $502_B$ broadcast by the second station (B), the third station (C) can receive general service information about the group (G1), and information about the timing of the group's short publishing beacon $502_i$ and timing of a query window 505 associated with the group (G1). If the third station (C) is interested in getting detail service information about the stations (A, B) of the group (G1), the third station (C) can prepare to engage one of the members stations (A, B) of the group (G1) in a service request and response event 503 during a query window 505 of the group (G1).

During a query window $505_B$ of the second station (B), the third station (C) can transmit a service discovery request 504. The service discovery request $504_C$ can be received by a member station of the group, for example, the second station (B). In response to the service request $504_C$, the second station (B) can transmit a service response $506_B$, or service response frame, including detailed information about services available from the group (G1). In certain examples, a station can use a service request and response event to update service information for a group that is already known to the station.

Figure 6:
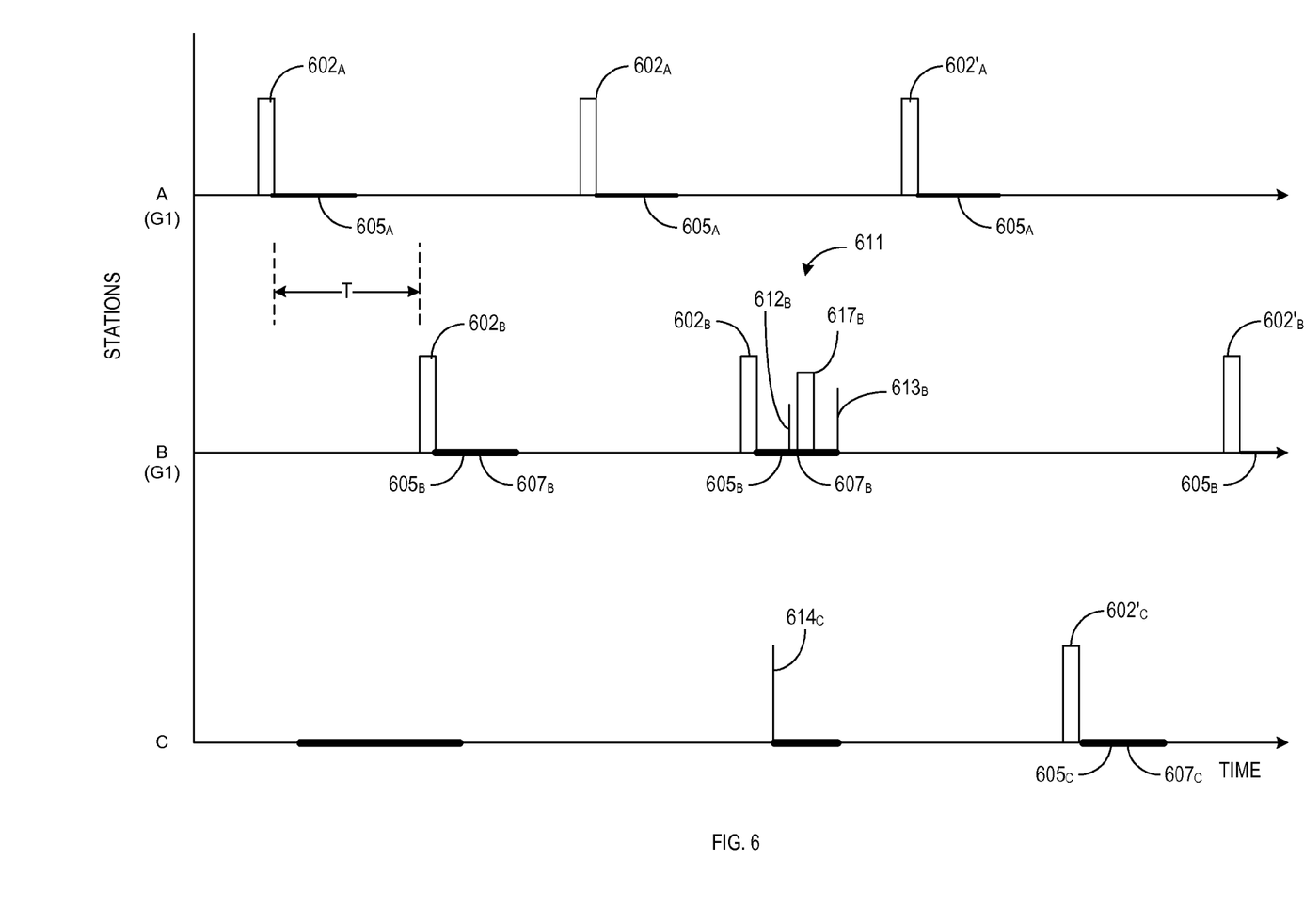
FIG. 6 illustrates generally an example join method of an example reactive service discovery protocol.

In certain examples, a station may want to join a group, such as a station that has learned general service information about the group using a publishing beacon of the group, or a station that has learned detailed service information about the group using a service request and response event. FIG. 6 illustrates generally an example join method 611 of an example reactive service discovery protocol. In the illustrated example, the group (G1) can include a first station (A) and a second station (B). In certain examples, the first and second stations (A, B) of the group (G1) can alternately broadcast a short publishing beacon $602_A$, $602_B$ at a beacon interval (T) to advertise the group (G1). In certain examples, a broadcast of a publishing beacon 602, can be followed by a query window 605, a join window 607 or a both a query window 605 and a join window 607. A third station (C) can represent a station joining the group (G1). It is understood that a group can include more or less member stations without departing from the scope of the present subject matter. In the illustrated example, the third station (C) has received a short publishing beacon $602_B$ from the group (G1). The short publishing beacon $602_B$ can provide timing information for a future join window 607. In certain examples, the join window 607 can follow broadcast of a short publishing beacon $602_i$. The third station (C) can transmit a join request $614_C$ during the join window 607. In certain examples, the join request 614C can include the Group ID of the group (G1) the third station (C) is attempting to join. In some examples, the join request $604_C$ can include service information associated with the third station (C). In certain examples, the member station (e.g., the second station (B)) associated with the broadcast of the short publishing beacon $602_B$ preceding the join window 607 can receive the join request $614_C$ and can acknowledge reception of the join request $614_C$ by transmitting a acknowledgement. In certain examples, the acknowledgement can be an acknowledgement (ACK) frame $612_B$, a join response $617_B$ that can include service information about the group (G1), or both the acknowledgement (ACK) frame $612_B$ and the join response $617_B$. In certain examples, reception of the acknowledgement (ACK) frame $612_B$ or join response $617_B$ by the third station (C) can confirm membership of the third station (C) in the group (G1). In some examples, if a joining station does not receive an acknowledgement (ACK) frame or a service response, the joining station has not been accepted by the group and can send a join request during a later join window.

In certain examples, other member stations of a group can be expected to wake up and listen during a join window. If a join request is received during the join window, all the members of the group can update group service information by adding the service information about a newly accepted member of the group. In certain examples, a join request can be a unicast frame. In such examples, the member station transmitting the acknowledgement or service response can also transmit a confirmation $613_B$ to other member stations to expedite updating service information of other member stations. The confirmation $613_B$ can include updated device count information, beacon adjustment information, or combinations thereof.

In certain examples, a group can be an all-connected group. In such examples, a non-member station can be expected to receive a publishing beacon from each member of the group before transmitting a join request. Short publishing beacons $602'_A$, $602'_B$, $602'_C$ broadcast after acceptance of the third station to the group can include high-level service information of the third station (C).

As discussed above, a short publishing beacon can include group maintenance information. In certain examples, stations of a group remain in a sleep mode to conserve energy when the station is not transmitting or is not listening. To make use of and propagate group maintenance information, in certain examples, each member station can wake up one beacon interval before the station is scheduled to broadcast a short publishing beacon. In certain examples, each member station can wake up one beacon interval after the station broadcasts a short publishing beacon to make use of maintenance information included in a short publishing beacon. In some examples, each station can wake up and listen one beacon interval before the station is scheduled to broadcast a short publishing beacon and can wake up and listen one beacon interval after the station broadcasts a short publishing beacon to make use of maintenance information included in a short publishing beacon.

In certain examples, stations that wake up a beacon interval before the station is scheduled to broadcast a short publishing beacon can receive the short publishing beacon of an immediately up-chain station. In some examples, when a station wakes up but does not receive a publishing beacon from the immediately up-chain station, the station can log an error in the error information for a future short publishing beacon. In certain examples, the station can update other publishing beacon information including, but not limited to, station count information, and beacon adjustment information.

Figure 7:
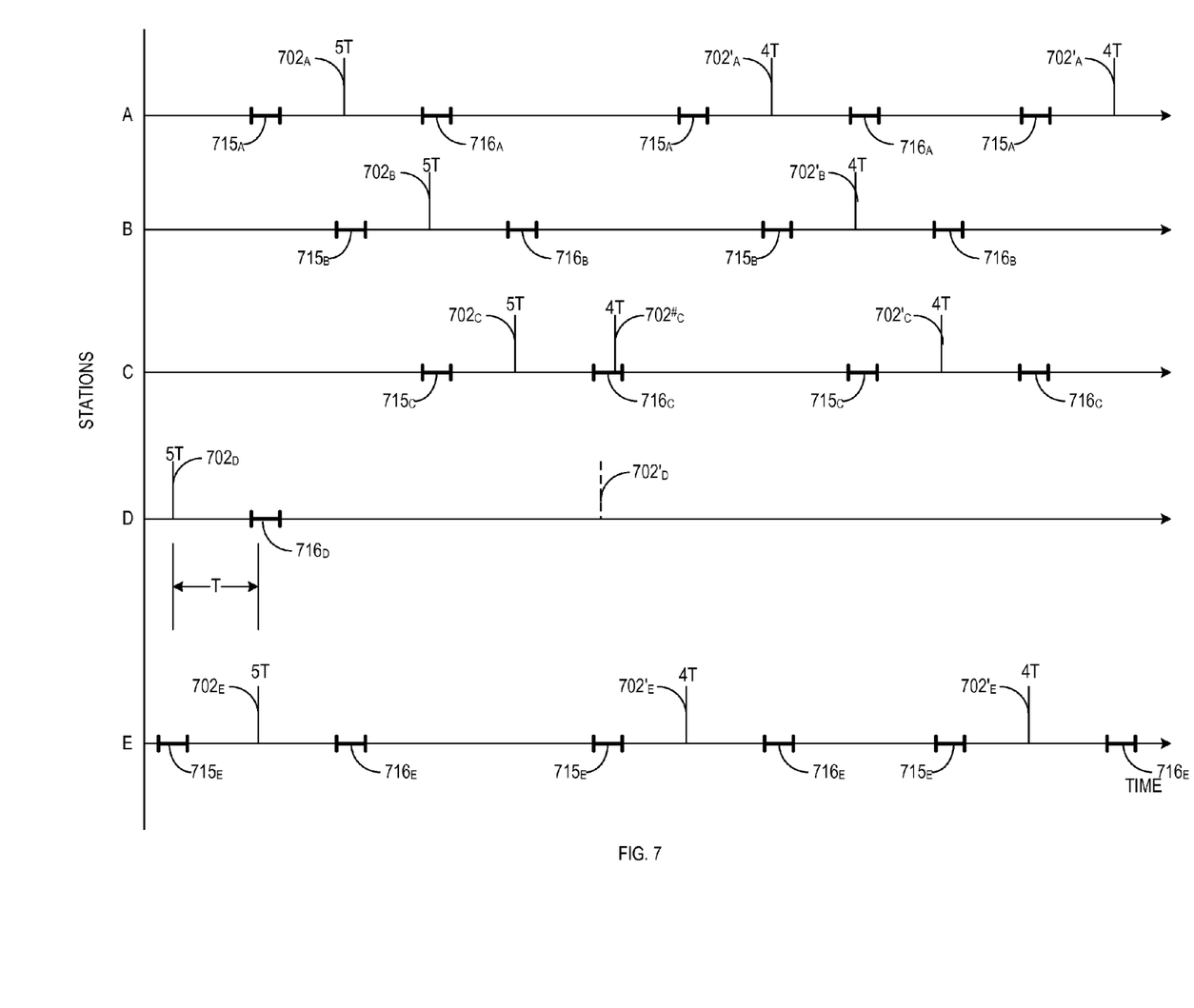
FIG. 7 illustrates generally an example method of group maintenance for an example reactive service discovery protocol.

In certain examples, when a station wakes up but does not receive a publishing beacon from an immediately down-chain station, the station can log an error in the error information of a future short publishing beacon. In some examples, the station can update other publishing beacon information including, but not limited to, station count information, and beacon adjustment information. In certain examples, the station can transmit a short publishing beacon on behalf of the missing down-chain station at a time including a small offset from the scheduled publishing beacon transmission time. In such an example, transmission of the group's publishing beacon can continue seamlessly. FIG. 7 illustrates generally an example method 700 of group maintenance for an example reactive service discovery protocol. In the illustrated example, a group can include five stations (A, B, C, D, E). The five stations can alternately broadcast a short publishing beacon $702_i$ at an beacon interval (T) such that each station broadcasts a publishing beacon $702_i$ at a frequency with a period of about 5 T. Each member station of the illustrated example can wake up $715_i$ one beacon interval before the station is scheduled to broadcast a short publishing beacon and can wake up $716_i$ one beacon interval after broadcasting a short publishing beacon. The illustrated example also shows various join windows $707_i$ and query windows $705_i$ associated with the example reactive service discovery protocol. The illustrated example, shows the third station (C) waking up $715_C$ to check the publishing beacon of the fourth station (D). In the illustrated example, the fourth station (D) has left the group and does not transmit a publishing beacon at the fourth station's (D) scheduled publishing beacon transmit time as shown by a dashed publishing beacon $702'_D$. In an example, when the third station (C) does not receive a publishing beacon from the fourth station (D), the third station transmits a replacement short publishing beacon $702^{\#}_C$ on behalf of the missing fourth station (D) at a time offset a short duration from the scheduled publishing beacon transmit time. In certain examples, the replacement short publishing beacon $702^{\#}_C$ can include error information indicating that the fourth station (D) has left the group. In some examples, the replacement short publishing beacon $702^{\#}_C$ can include updated station count information and updated beacon interval adjustment information. In the illustrated example, the updated station count information and beacon interval adjustment information can indicate that the group includes four stations and each station's interval between broadcasts of the short publishing beacon $702_i$ is changed from about 5 T to about 4 T.

In the illustrated example, the fifth station (E) in the group can wake up $716_E$ to receive the publishing beacon of the fourth station (D). Upon failing to receive the publishing beacon $702'_D$ from the missing fourth station (D), the fifth station (E) can log an error in the error information of the publishing beacon, and can update the station count and beacon interval adjustment information. In certain examples, the fifth station (D) can receive the replacement short publishing beacon $702^{\#}_C$ from the third station (C) and can propagate the error information when the fifth station (E) transmits a revised short publishing beacon $702'_E$. In certain examples, propagation of a missing station can be expedited using the join window because each station of the group can be expected to wake from the sleep mode and listen for join requests during the join window as well as the publishing beacon preceding the join window.

EXAMPLES AND ADDITIONAL NOTES

In Example 1, a method for group-based reactive service discovery can include receiving a first short publishing beacon at a first station belonging to a first group of stations, listening for a join request from a second station during a join request interval following receipt of the first short publishing beacon, the second station not belonging to the first group of stations when the first short publishing beacon is received, and wherein the first station is configured to communicate with the other stations of the first group of stations using single-hop communications.

In Example 2, the method of Example 1 optionally includes receiving a confirmation beacon at the first station during the join request interval, wherein the confirmation beacon includes a quantity of stations belonging to the first group and a beacon interval adjustment value.

In Example 3, the method of any one or more of Examples 1-2 optionally includes broadcasting a second short publishing beacon by the first station.

In Examples 4, the method of any one or more of Examples 1-3 optionally includes receiving a service request at the first station from a third station during a query interval, the query interval beginning at or near the broadcasting of the second short publishing beacon.

In Examples 5, the method of any one or more of Examples 1-4 optionally includes broadcasting a service response frame using the first station, wherein the service response frame includes information about available services of each of the stations belonging to the first group of stations.

In Example 6, the broadcasting the second short publishing beacon of any one or more of Examples 1-5 optionally includes broadcasting first service information, the first service information configured to provide a general indication of services available from the first group, and the broadcasting the service response frame of any one or more of Examples 1-5 optionally includes broadcasting second service information the second service information configured to provide an indication of specific services available from the first group.

In Example 7, the method of any one or more of Examples 1-6 optionally includes waking the first station at or near an immediately up-chain beacon time, receiving a second short publishing beacon from an immediately up-chain device, and updating information for the first short publishing beacon using information received in the second short publishing beacon.

In Example 8, the method of any one or more of Examples 1-7 optionally includes waking the first station from a sleep mode at or near an immediately down-chain beacon time, receiving a second short publishing beacon from an immediately down-chain station, and switching the first station to the sleep mode.

In Example 9, the first short publishing beacon of any one or more of Examples 1-8 optionally includes an error bitmap.

In Example 10, the method of any one or more of Examples 1-9 optionally includes waking the first station from a sleep mode at or near an immediately down-chain beacon time, listening for a second short publishing beacon from an immediately down-chain station during a query interval following the immediately down-chain beacon time, and recording in the error bit map that the immediately down-chain station has left the first group if the second short publishing beacon is not received at the first station.

In Example 11, the receiving a first short publishing beacon of any one or more of Examples 1-10 optionally includes receiving the first short publishing beacon from a IEEE 802.11 wireless network using a IEEE 801.11 compatible transceiver.

In Example 12, a wireless communication device for group-based reactive service discovery can include a IEEE 802.11 compatible wireless transceiver. The wireless communication device can be configured to receive a first short publishing beacon of a first group of stations, wherein the first group of stations includes the wireless communication device, and to listen for a join request from a second station during a join request interval following the receiving of the first short publishing beacon, the second station not belonging to the first group of stations when the first short publishing beacon is received;

In Example 13, the IEEE 802.11 compatible wireless transceiver of any one or more of Examples 1-12 optionally is configured to receive a confirmation beacon during the join request interval indicating acceptance of the second station into the first group of stations, wherein the confirmation beacon can include a quantity of stations belonging to the first group and a beacon interval adjustment value.

In Example 14, the IEEE 802.11 compatible wireless transceiver of any one or more of Examples 1-13 optionally is configured to broadcast a second short publishing beacon, and to receive a service request from a third station during a query interval, the query interval configured to begin at or near the broadcast of the second short publishing beacon.

In Example 15, the IEEE 802.11 compatible wireless transceiver of any one or more of Examples 1-14 optionally is configured to broadcast a service response frame in response to the service request, wherein the service response frame includes information about available services of each of the stations belonging to the first group of stations, wherein the second short publishing beacon includes first service information, the first service information configured to provide a general indication of services available from the first group, and wherein the service response frame includes second service information, the second service information configured to provide an indication of specific services available from the first group.

In Example 16, the IEEE 802.11 compatible wireless transceiver of any one or more of Examples 1-15 optionally is configured to wake the wireless communication device from a sleep mode at or near an immediately up-chain beacon time, to receive a second short publishing beacon from an immediately up-chain device, and to update information for the first short publishing beacon using information received in the second short publishing beacon.

In Example 17, the first short publishing beacon of any one or more of Examples 1-16 optionally includes an error bitmap, the IEEE 802.11 compatible wireless transceiver of any one or more of Examples 1-16 optionally is configured to wake the wireless communication device from a sleep mode at or near an immediately down-chain beacon time and to record an indication the immediately down-chain station has left the first group using the error bitmap if a second short publishing beacon is not received at or near the down-chain beacon time and is not received during a query interval immediately following the down-chain beacon time.

In Example 18, a wireless communication device configured for group-based reactive service discovery can include a processor; memory coupled to the processor, an antenna, and an IEEE 802.11 compatible wireless transceiver. The IEEE 802.11 compatible wireless transceiver can be configured to provide wireless communications of information to be store into and retrieved from the memory using the antenna, to wake from a sleep mode at or near an immediately up-chain beacon time, to receive a first short publishing beacon from an immediately up-chain station, wherein the immediately up-chain station and the wireless communication module belong to a first group of stations, to enter the sleep mode after receiving the first short publishing beacon, to wake from the sleep mode at or near an immediately down-chain beacon time, to receive a third short publishing beacon from an immediately down-chain device, and to enter the sleep mode after receiving the third short publishing beacon.

In Example 19, the processor of any one or more of Examples 1-18 optionally is configured to wake the wireless communication device from a sleep mode at or near an immediately up-chain beacon time, to update information for a second short publishing beacon using information received in the first short publishing beacon, to switch the wireless communication device to the sleep mode after receiving the first short publishing beacon, to wake the wireless communication device from a sleep mode at or near an immediately down-chain beacon time, to switch the wireless communication device to the sleep mode after receiving the third short publishing beacon, and to record an indication the immediately down-chain station has left the first group using an error bitmap if the third short publishing beacon is not received at or near the down-chain beacon time and is not received during a query interval immediately following the down-chain beacon time, wherein the first short publishing beacon includes the error bitmap.

In Example 20, the IEEE 802.11 compatible wireless transceiver of any one or more of Examples 1-19 optionally is configured to broadcast the second short publishing beacon, to receive a service request from a first station during a query interval, the query interval configured to begin at or near the broadcast of the third short publishing beacon, to broadcast a service response frame in response to the service request, wherein the service response frame includes information about available services of each of the stations belonging to the first group of stations, wherein the second short publishing beacon includes first service information, the first service information configured to provide a general indication of services available from the first group; and wherein the service response frame includes second service information, the second service information configured to provide an indication of specific services available from the first group.

In Example 21, the IEEE 802.11 compatible wireless transceiver of any one or more of Examples 1-20 optionally is configured, to receive a fourth short publishing beacon from a first station of the first group of stations, to listen for a join request from a second station during a join request interval directly following the receiving of the first short publishing beacon, the second station not belonging to the first group of stations when the first short publishing beacon is received, and to receive a confirmation beacon during the join request interval indicating acceptance of the second station into the first group of stations, wherein the confirmation beacon includes the quantity of stations belonging to the first group and a beacon interval adjustment value.

Example 22 can include, or can optionally be combined with any portion or combination of any portions of any one or more of Examples 1 through 21 to include, subject matter that can include means for performing any one or more of the functions of Examples 1 through 21, or a machine-readable medium including instructions that, when performed by a machine, cause the machine to perform any one or more of the functions of Examples 1 through 21.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The above detailed description includes references to the accompanying drawings, which form a part of the detailed description. The drawings show, by way of illustration, specific embodiments in which the subject matters can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of legal equivalents to which such claims are entitled.

What is claimed is:

1. A non-transitory, machine readable medium, the machine readable medium including instructions that, when executed by one or more processors of a wireless communication device, configure the device to:
   receive a first short publishing beacon at a first station from another station, the first station belonging to a first group of stations;
   listen for a join request from a second station during a join request interval following receipt of the first short publishing beacon, the second station not belonging to the first group of stations when the first short publishing beacon is received;
   receive a confirmation beacon at the first station during the join request interval, wherein the confirmation beacon includes a quantity of stations belonging to the first group and a beacon interval adjustment value; and
   wherein the first station is configured to communicate with other stations of the first group of stations using single-hop communications.

2. The machine readable medium of claim 1, including instructions that, when executed by the one or more processors, configure the device to broadcast a second short publishing beacon by the first station.

3. The machine readable medium of claim 2, including instructions that, when executed by the one or more processors, configure the device to receive a service request at the first station from a third station during a query interval, the query interval following the broadcasting of the second short publishing beacon.

4. The machine readable medium of claim 3, including instructions that, when executed by the one or more processors, configure the device to broadcast a service response frame using the first station, wherein the service response frame includes information about available services of each of the stations belonging to the first group of stations.

5. The machine readable medium of claim 4, wherein to broadcast the second short publishing beacon includes to broadcast first service information, the first service information configured to provide a general indication of services available from the first group; and
wherein to broadcast the service response frame includes to broadcast second service information the second service information configured to provide an indication of specific services available from the first group.

6. The machine readable medium of claim 1, including instructions that, when executed by the one or more processors, configure the device to:
wake the first station at or near an immediately up-chain beacon time;
receive a second short publishing beacon from an immediately up-chain device; and
update information for the first short publishing beacon using information received in the second short publishing beacon.

7. The machine readable medium of claim 1, including instructions that, when executed by the one or more processors, configure the device to:
wake the first station from a sleep mode at or near an immediately down-chain beacon time;
receive a second short publishing beacon from an immediately down-chain station; and
switch the first station to the sleep mode.

8. The machine readable medium of claim 1, wherein the first short publishing beacon includes an error bitmap.

9. The machine readable medium of claim 8, including instructions that, when executed by the one or more processors, configure, the device to:
wake the first station from a sleep mode at or near an immediately down-chain beacon time;
listen for a second short publishing beacon from an immediately down-chain station during a query interval following the immediately down-chain beacon time; and
record in the error bit map that the immediately down-chain station has left the first group if the second short publishing beacon is not received at the first station.

10. The machine readable medium of claim 1, wherein to receive receiving a first short publishing beacon includes to receive the first short publishing beacon from a IEEE 802.11 wireless network using a IEEE 801.11 compatible transceiver.

11. A wireless communication device for group-based reactive service discovery, the wireless communication device comprising:
a IEEE 802.11 compatible wireless transceiver configured
to receive a first short publishing beacon from a station of a first group of stations, wherein the first group of stations includes the wireless communication device, and
to listen for a join request from a second station during a join request interval following the receiving of the first short publishing beacon, the second station not belonging to the first group of stations when the first short publishing beacon is received; and
wherein the IEEE 802.11 compatible wireless transceiver is configured to receive a confirmation beacon during the join request interval indicating acceptance of the second station into the first group of stations, wherein the confirmation beacon includes a quantity of stations belonging to the first group and a beacon interval adjustment value.

12. The wireless communication device of claim 11, wherein the IEEE 802.11 compatible wireless transceiver is configured to broadcast a second short publishing beacon; and
to receive a service request from a third station during a query interval, the query interval configured to begin at or near the broadcast of the second short publishing beacon.

13. The wireless communication device of claim 12, wherein the IEEE 802.11 compatible wireless transceiver is configured to broadcast a service response frame in response to the service request, wherein the service response frame includes information about available services of each of the stations belonging to the first group of stations;
wherein the second short publishing beacon includes first service information, the first service information configured to provide a general indication of services available from the first group; and
wherein the service response frame includes second service information, the second service information configured to provide an indication of specific services available from the first group.

14. The wireless communication device of claim 11, wherein the IEEE 802.11 compatible wireless transceiver is configured to wake the wireless communication device from a sleep mode at or near an immediately up-chain beacon time, to receive a second short publishing beacon from an immediately up-chain device; and to update information for the first short publishing beacon using information received in the second short publishing beacon.

15. The wireless communication device of claim 11, wherein the first short publishing beacon includes an error bitmap;
wherein the IEEE 802.11 compatible wireless transceiver is configured to wake the wireless communication device from a sleep mode at or near an immediately down-chain beacon time, and
to record an indication the immediately down-chain station has left the first group using the error bitmap if a second short publishing beacon is not received at or near the down-chain beacon time and is not received during a query interval immediately following the down-chain beacon time.

16. A wireless communication device configured for group-based reactive service discovery, the wireless communication device comprising:
a processor;
memory coupled to the processor;
an antenna; and
an IEEE 802.11 compatible wireless transceiver configured
to provide wireless communications of information to be store into and retrieved from the memory using the antenna;

to wake from a sleep mode at or near an immediately up-chain beacon time,
to receive a first short publishing beacon from an immediately up-chain station, wherein the immediately up-chain station and the wireless communication module belong to a first group of stations,
to enter the sleep mode after receiving the first short publishing beacon;
to wake from the sleep mode at or near an immediately down-chain beacon time,
to receive a third short publishing beacon from an immediately down-chain device; and
to enter the sleep mode after receiving the third short publishing beacon.

17. The wireless communication device of claim 16, wherein the processor is configured
to wake the wireless communication device from a sleep mode at or near an immediately up-chain beacon time;
to update information for a second short publishing beacon using information received in the first short publishing beacon;
to switch the wireless communication device to the sleep mode after receiving the first short publishing beacon.
to wake the wireless communication device from a sleep mode at or near an immediately down-chain beacon time,
to switch the wireless communication device to the sleep mode after receiving the third short publishing beacon; and
to record an indication the immediately down-chain station has left the first group using an error bitmap if the third short publishing beacon is not received at or near the down-chain beacon time and is not received during a query interval immediately following the down-chain beacon time, wherein the first short publishing beacon beacon includes the error bitmap.

18. The wireless communication device of claim 16, wherein the IEEE 802.11 compatible wireless transceiver is configured,
to broadcast the second short publishing beacon;
to receive a service request from a first station during a query interval, the query interval configured to begin at or near the broadcast of the third short publishing beacon;
to broadcast a service response frame in response to the service request, wherein the service response frame includes information about available services of each of the stations belonging to the first group of stations;
wherein the second short publishing beacon includes first service information, the first service information configured to provide a general indication of services available from the first group; and
wherein the service response frame includes second service information, the second service information configured to provide an indication of specific services available from the first group.

19. The wireless communication device of claim 16, wherein the IEEE 802.11 compatible wireless transceiver is configured,
to receive a fourth short publishing beacon from a first station of the first group of stations,
to listen for a join request from a second station during a join request interval directly following the receiving of the first short publishing beacon, the second station not belonging to the first group of stations when the first short publishing beacon is received; and
to receive a confirmation beacon during the join request interval indicating acceptance of the second station into the first group of stations, wherein the confirmation beacon includes the quantity of stations belonging to the first group and a beacon interval adjustment value.

* * * * *